United States Patent
Yudovich et al.

(10) Patent No.: US 10,333,976 B1
(45) Date of Patent: Jun. 25, 2019

(54) OPEN SOURCE INTELLIGENCE DECEPTIONS

(71) Applicant: ILLUSIVE NETWORKS LTD., Tel Aviv (IL)

(72) Inventors: Hadar Yudovich, Modiin (IL); Nimrod Lavi, Ramat Hasharon (IL); Sharon Bittan, Raanana (IL); Tom Kahana, Gan Yavne (IL); Tom Sela, Holon (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 0 days.

(21) Appl. No.: 16/043,137

(22) Filed: Jul. 23, 2018

(51) Int. Cl.
*H04L 29/06* (2006.01)

(52) U.S. Cl.
CPC ...... *H04L 63/1491* (2013.01); *H04L 63/1416* (2013.01); *H04L 2463/146* (2013.01)

(58) Field of Classification Search
None
See application file for complete search history.

(56) References Cited

U.S. PATENT DOCUMENTS

| | | |
|---|---|---|
| 6,363,489 B1 | 3/2002 | Comay et al. |
| 6,618,709 B1 | 9/2003 | Sneeringer |
| 7,065,657 B1 | 6/2006 | Moran |
| 7,089,589 B2 | 8/2006 | Chefalas et al. |
| 7,093,291 B2 | 8/2006 | Bailey |
| 7,516,227 B2 | 4/2009 | Cohen |
| 7,574,741 B2 | 8/2009 | Aviani et al. |
| 7,636,944 B2 | 12/2009 | Raikar |
| 7,665,134 B1 | 2/2010 | Hernacki et al. |
| 7,694,339 B2 | 4/2010 | Blake et al. |
| 7,725,937 B1 | 5/2010 | Levy |
| 7,752,664 B1 | 7/2010 | Satish et al. |
| 7,945,953 B1 | 5/2011 | Salinas et al. |
| 8,015,284 B1 | 9/2011 | Isenberg et al. |
| 8,181,249 B2 | 5/2012 | Chow et al. |

(Continued)

FOREIGN PATENT DOCUMENTS

| | | |
|---|---|---|
| WO | 2006131124 A1 | 12/2006 |
| WO | 2015001969 A1 | 1/2015 |
| WO | 2015047555 A1 | 4/2015 |

OTHER PUBLICATIONS

Medkova, "Honeypot Testbed for Network Defence Strategy Evaluation", pp. 887-888. (Year: 2017).*

(Continued)

*Primary Examiner* — Benjamin E Lanier
(74) *Attorney, Agent, or Firm* — Soquel Group I.P Ltd.

(57) ABSTRACT

A system to detect attackers who attempt to breach an enterprise network and attackers who have already breached the enterprise network, including an open source intelligence (OSINT) discoverer scanning the Internet to discover data related to an enterprise that is available online, an OSINT replacer generating deceptive files by replacing placeholders within template files with deceptive information, based on the data discovered by the OSINT discoverer, an OSINT distributor planting the deceptive files generated by the OSINT replacer within designated OSINT resources, and a deception management server that alerts an administrator in response to an attacker attempting to make a connection within the network using information in a deceptive file planted by the OSINT distributor.

18 Claims, 6 Drawing Sheets

(56) References Cited

U.S. PATENT DOCUMENTS

| | | | |
|---|---|---|---|
| 8,181,250 B2 | 5/2012 | Rafalovich et al. | |
| 8,250,654 B1 | 8/2012 | Kennedy et al. | |
| 8,375,447 B2 | 2/2013 | Amoroso et al. | |
| 8,499,348 B1 | 7/2013 | Rubin | |
| 8,528,091 B2 | 9/2013 | Bowen et al. | |
| 8,549,642 B2 | 10/2013 | Lee | |
| 8,549,643 B1 | 10/2013 | Shou | |
| 8,719,938 B2 | 5/2014 | Chasko et al. | |
| 8,739,281 B2 | 5/2014 | Wang et al. | |
| 8,739,284 B1 | 5/2014 | Gardner | |
| 8,769,684 B2 | 7/2014 | Stolfo et al. | |
| 8,819,825 B2 | 8/2014 | Keromytis et al. | |
| 8,856,928 B1 | 10/2014 | Rivner et al. | |
| 8,881,288 B1 | 11/2014 | Levy et al. | |
| 8,925,080 B2 | 12/2014 | Hebert | |
| 9,009,829 B2 | 4/2015 | Stolfo et al. | |
| 9,043,905 B1 | 5/2015 | Allen et al. | |
| 9,043,919 B2* | 5/2015 | Wyatt | G06F 21/564 707/708 |
| 9,124,622 B1 | 9/2015 | Falkowitz et al. | |
| 9,152,808 B1 | 10/2015 | Ramalingam et al. | |
| 9,240,976 B1 | 1/2016 | Murchison | |
| 9,325,728 B1 | 4/2016 | Kennedy et al. | |
| 9,356,942 B1 | 5/2016 | Joffe | |
| 9,386,030 B2 | 7/2016 | Vashist et al. | |
| 9,495,188 B1 | 11/2016 | Ettema et al. | |
| 2002/0066034 A1 | 5/2002 | Schlossberg et al. | |
| 2002/0194489 A1 | 12/2002 | Almogy et al. | |
| 2003/0084349 A1 | 5/2003 | Friedrichs et al. | |
| 2003/0110396 A1 | 6/2003 | Lewis et al. | |
| 2003/0145224 A1 | 7/2003 | Bailey | |
| 2004/0088581 A1 | 5/2004 | Brawn et al. | |
| 2004/0128543 A1 | 7/2004 | Blake et al. | |
| 2004/0148521 A1 | 7/2004 | Cohen et al. | |
| 2004/0160903 A1 | 8/2004 | Gai et al. | |
| 2004/0172557 A1 | 9/2004 | Nakae et al. | |
| 2004/0255155 A1 | 12/2004 | Stading | |
| 2005/0114711 A1 | 5/2005 | Hesselink et al. | |
| 2005/0132206 A1 | 6/2005 | Palliyil et al. | |
| 2005/0149480 A1 | 7/2005 | Deshpande | |
| 2005/0235360 A1 | 10/2005 | Pearson | |
| 2006/0010493 A1 | 1/2006 | Piesco et al. | |
| 2006/0041761 A1 | 2/2006 | Neumann et al. | |
| 2006/0069697 A1 | 3/2006 | Shraim et al. | |
| 2006/0101516 A1 | 5/2006 | Sudaharan et al. | |
| 2006/0106866 A1* | 5/2006 | Green | H04L 63/123 709/224 |
| 2006/0161982 A1 | 7/2006 | Chari et al. | |
| 2006/0224677 A1 | 10/2006 | Ishikawa et al. | |
| 2006/0242701 A1 | 10/2006 | Black et al. | |
| 2007/0028301 A1 | 2/2007 | Shull et al. | |
| 2007/0039038 A1 | 2/2007 | Goodman et al. | |
| 2007/0157315 A1 | 7/2007 | Moran | |
| 2007/0192853 A1 | 8/2007 | Shraim et al. | |
| 2007/0226796 A1 | 9/2007 | Gilbert et al. | |
| 2007/0299777 A1 | 12/2007 | Shraim et al. | |
| 2008/0016570 A1 | 1/2008 | Capalik | |
| 2008/0046989 A1* | 2/2008 | Wahl | G06F 21/55 726/7 |
| 2008/0086773 A1 | 4/2008 | Tuvell et al. | |
| 2008/0155693 A1 | 6/2008 | Mikan et al. | |
| 2009/0019547 A1 | 1/2009 | Palliyil et al. | |
| 2009/0144827 A1 | 6/2009 | Peinado et al. | |
| 2009/0222920 A1 | 9/2009 | Chow et al. | |
| 2009/0241173 A1 | 9/2009 | Troyansky | |
| 2009/0241191 A1 | 9/2009 | Keromytis et al. | |
| 2009/0241196 A1 | 9/2009 | Troyansky et al. | |
| 2009/0328216 A1 | 12/2009 | Rafalovich et al. | |
| 2010/0058456 A1 | 3/2010 | Jajodia et al. | |
| 2010/0071051 A1 | 3/2010 | Choyi et al. | |
| 2010/0077483 A1 | 3/2010 | Stolfo et al. | |
| 2010/0082513 A1 | 4/2010 | Liu | |
| 2010/0251369 A1 | 9/2010 | Grant | |
| 2010/0269175 A1 | 10/2010 | Stolfo et al. | |
| 2011/0016527 A1 | 1/2011 | Yanovsky et al. | |
| 2011/0154494 A1 | 6/2011 | Sundaram et al. | |
| 2011/0167494 A1 | 7/2011 | Bowen et al. | |
| 2011/0214182 A1 | 9/2011 | Adams et al. | |
| 2011/0258705 A1 | 10/2011 | Vestergaard et al. | |
| 2011/0307705 A1 | 12/2011 | Fielder | |
| 2012/0005756 A1 | 1/2012 | Hoefelmeyer et al. | |
| 2012/0079596 A1* | 3/2012 | Thomas | G06F 21/55 726/24 |
| 2012/0084866 A1 | 4/2012 | Stolfo | |
| 2012/0167208 A1 | 6/2012 | Buford et al. | |
| 2012/0210388 A1 | 8/2012 | Kolishchak | |
| 2012/0246724 A1 | 9/2012 | Sheymov et al. | |
| 2012/0311703 A1 | 12/2012 | Yanovsky et al. | |
| 2013/0061055 A1 | 3/2013 | Schibuk | |
| 2013/0086691 A1 | 4/2013 | Fielder | |
| 2013/0212644 A1 | 8/2013 | Hughes et al. | |
| 2013/0227697 A1 | 8/2013 | Zandani | |
| 2013/0263226 A1 | 10/2013 | Sudia | |
| 2014/0082730 A1 | 3/2014 | Vashist et al. | |
| 2014/0101724 A1 | 4/2014 | Wick et al. | |
| 2014/0115706 A1 | 4/2014 | Silva et al. | |
| 2014/0201836 A1 | 7/2014 | Amsler | |
| 2014/0208401 A1 | 7/2014 | Balakrishnan et al. | |
| 2014/0237599 A1* | 8/2014 | Gertner | H04L 63/145 726/24 |
| 2014/0259095 A1 | 9/2014 | Bryant | |
| 2014/0298469 A1 | 10/2014 | Marion et al. | |
| 2014/0310770 A1 | 10/2014 | Mahaffey | |
| 2014/0337978 A1 | 11/2014 | Keromytis et al. | |
| 2014/0359708 A1 | 12/2014 | Schwartz | |
| 2015/0007326 A1 | 1/2015 | Mooring et al. | |
| 2015/0013006 A1 | 1/2015 | Shulman et al. | |
| 2015/0047032 A1 | 2/2015 | Hannis et al. | |
| 2015/0074750 A1 | 3/2015 | Pearcy et al. | |
| 2015/0074811 A1 | 3/2015 | Capalik | |
| 2015/0096048 A1 | 4/2015 | Zhang et al. | |
| 2015/0128246 A1 | 5/2015 | Feghali et al. | |
| 2015/0156211 A1 | 6/2015 | Chi Tin et al. | |
| 2015/0295943 A1* | 10/2015 | Malachi | H04L 63/145 726/24 |
| 2015/0326587 A1 | 11/2015 | Vissamsetty et al. | |
| 2015/0326598 A1 | 11/2015 | Vasseur et al. | |
| 2016/0019395 A1 | 1/2016 | Ramalingam et al. | |
| 2016/0080414 A1 | 3/2016 | Kolton et al. | |
| 2016/0212167 A1 | 7/2016 | Dotan et al. | |
| 2016/0261608 A1 | 9/2016 | Hu et al. | |
| 2016/0300227 A1 | 10/2016 | Subhedar et al. | |
| 2016/0308895 A1 | 10/2016 | Kotler et al. | |
| 2016/0323316 A1 | 11/2016 | Kolton et al. | |
| 2016/0359882 A1* | 12/2016 | Touboul | G06F 21/577 |
| 2016/0373447 A1 | 12/2016 | Akiyama et al. | |
| 2017/0032130 A1 | 2/2017 | Joseph Durairaj et al. | |
| 2017/0093910 A1* | 3/2017 | Gukal | H04L 63/1416 |

OTHER PUBLICATIONS

Wikipedia, Active Directory, https://en.wikipedia.org/wiki/Active_Directory, Jun. 24, 2015.
Wikpedia, Apple Filing Protocol, https://en.wikipedia.org/wiki/Apple_Filing_Protocol, Aug. 14, 2015.
Wikipedia, DMZ (computing), https://en.wikipedia.org/wiki/DMZ_(computing), Jun. 17, 2015.
Wikipedia, Domain Name System, https://en.wikipedia.org/wiki/Domain_Name_System, Jul. 14, 2015.
Wikipedia, Firewall (computing), https://en.wikipedia.org/wiki/Firewall_(computing), Jul. 14, 2015.
Wikipedia, Honeypot (computing), https://en.wikipedia.org/wiki/Honeypot_(computing), Jun. 21, 2015.
Wikipedia, Kerberos (protocol), https://en.wikipedia.org/wiki/Kerberos_(protocol), Jun. 30, 2015.
Wikipedia, Lightweight Directory Access Protocol, https://en.wikipedia.org/wiki/Lightweight_Directory_Access_Protocol, Aug. 15, 2015.
Wikipedia, LM hash, https://en.wikipedia.org/wiki/LM_hash, Jun. 8, 2015.
Wikipedia, RADIUS, https://en.wikipedia.org/wiki/RADIUS, Aug. 16, 2015.

(56) References Cited

OTHER PUBLICATIONS

Wikipedia, Rainbow table, https://en.wikipedia.org/wiki/Rainbow_table, Jul. 14, 2015.
Wikipedia, Secure Shell, https://en.wikipedia.org/wiki/Honeypot_(computing), Jul. 12, 2015.
Wikipedia, Security Information and Event Management, https://en.wikipedia.org/wiki/Security_information_and_event_management, Jun. 23, 2015.
Wikipedia, Tarpit (networking), https://en.wikipedia.org/wiki/Tarpit_(networking), Jul. 3, 2014.
Mishra et al., Intrusion detection in wireless ad hoc networks, IEEE Wireless Communications, Feb. 2004, pp. 48-60.
Zhang et al., Intrusion detection techniques for mobile wireless networks, Journal Wireless Networks vol. 9(5), Sep. 2003, pp. 545-556, Kluwer Academic Publishers, the Netherlands.
U.S. Appl. No. 15/004,904, Office Action, dated May 27, 2016, 16 pages.
U.S. Appl. No. 15/004,904, Notice of Allowance, dated Oct. 19, 2016, 13 pages.
U.S. Appl. No. 15/175,048, Notice of Allowance, dated Oct. 13, 2016, 17 pages.
U.S. Appl. No. 15/175,050, Office Action, dated Aug. 19, 2016, 34 pages.
U.S. Appl. No. 15/175,050, Office Action, dated Nov. 30, 2016, 31 pages.
U.S. Appl. No. 15/175,050, Notice of Allowance, dated Mar. 21, 2017, 13 pages.
U.S. Appl. No. 15/175,052, Office Action, dated Feb. 13, 2017, 19 pages.
U.S. Appl. No. 15/175,052, Office Action, dated Jun. 6, 2017, 19 pages.
U.S. Appl. No. 15/175,054, Notice of Allowance, dated Feb. 21, 2017, 13 pages.
U.S. Appl. No. 15/403,194, Office Action, dated Feb. 28, 2017, 13 pages.
U.S. Appl. No. 15/403,194, Notice of Allowance, dated Jun. 16, 2017, 9 pages.
U.S. Appl. No. 15/406,731, Notice of Allowance, dated Apr. 20, 2017.
PCT Application No. PCT/IL16/50103, International Search Report and Written Opinion, dated May 26, 2016, 9 pages.
PCT Application No. PCT/IL16/50579, International Search Report and Written Opinion, dated Sep. 30, 2016, 7 pages.
PCT Application No. PCT/IL16/50581, International Search Report and Written Opinion, dated Nov. 29, 2016, 10 pages.
PCT Application No. PCT/IL16/50582, International Search Report and Written Opinion, dated Nov. 16, 2016, 11 pages.
PCT Application No. PCT/IL16/50583, International Search Report and Written Opinion, dated Dec. 8, 2016, 10 pages.
U.S. Appl. No. 15/175,052, Notice of Allowance, dated Jan. 2, 2018, 9 pages.
U.S. Appl. No. 15/679,180, Notice of Allowance, dated Mar. 26, 2018, 14 pages.
U.S. Appl. No. 15/722,351, Office Action, dated Mar. 9, 2018, 17 pages.
U.S. Appl. No. 15/682,577, Notice of Allowance, dated Jun. 14, 2018, 15 pages.

* cited by examiner

OPEN SOURCE INTELLIGENCE DECEPTIONS

CROSS REFERENCES TO RELATED APPLICATIONS

The contents of the following of applicant's US patent applications are hereby incorporated herein in their entirety.

U.S. patent application Ser. No. 15/722,351, entitled SYSTEM AND METHOD FOR CREATION, DEPLOYMENT AND MANAGEMENT OF AUGMENTED ATTACKER MAP, and filed on Oct. 2, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. patent application Ser. No. 15/403,194, now U.S. Pat. No. 9,787,715, entitled SYSTEM AND METHOD FOR CREATION, DEPLOYMENT AND MANAGEMENT OF AUGMENTED ATTACKER MAP, and filed on Jan. 11, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. patent application Ser. No. 15/004,904, now U.S. Pat. No. 9,553,885, entitled SYSTEM AND METHOD FOR CREATION, DEPLOYMENT AND MANAGEMENT OF AUGMENTED ATTACKER MAP, and filed on Jan. 23, 2016 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,251, entitled SYSTEM AND METHOD FOR CREATION, DEPLOYMENT AND MANAGEMENT OF AUGMENTED ATTACKER MAP, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,253, entitled SYSTEM AND METHOD FOR MULTI-LEVEL DECEPTION MANAGEMENT AND DECEPTION SYSTEM FOR MALICIOUS ACTIONS IN A COMPUTER NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,255, entitled METHODS AND SYSTEMS TO DETECT, PREDICT AND/OR PREVENT AN ATTACKER'S NEXT ACTION IN A COMPROMISED NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,259, entitled MANAGING DYNAMIC DECEPTIVE ENVIRONMENTS, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,261, entitled SYSTEMS AND METHODS FOR AUTOMATICALLY GENERATING NETWORK ENTITY GROUPS BASED ON ATTACK PARAMETERS AND/OR ASSIGNMENT OF AUTOMATICALLY GENERATED SECURITY POLICIES, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

FIELD OF THE INVENTION

The present invention relates to computer security, and in particular to detecting attackers of computer networks.

BACKGROUND OF THE INVENTION

Figure 1:
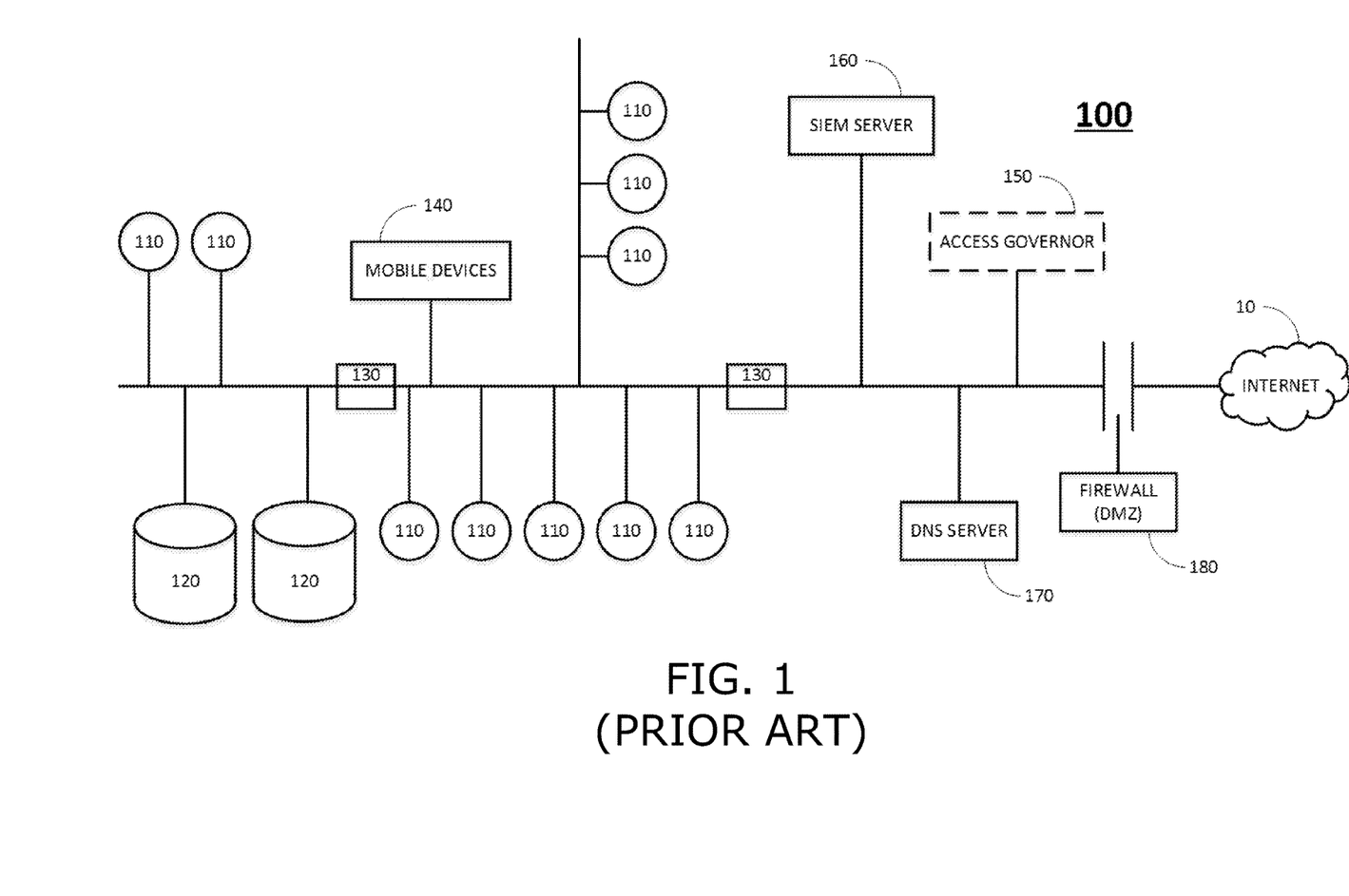
FIG. 1 is a simplified diagram of a prior art enterprise network connected to an external internet.

Reference is made to FIG. 1, which is a simplified diagram of a prior art enterprise network 100 connected to an external internet 10. Network 100 is shown generally with resources including computers 110, databases 120, switches and routers 130, and mobile devices 140 such as smart phones and tablets, for ease of presentation, although it will be appreciated by those skilled in the art that enterprise networks today are generally much more diverse and complex, and include other devices such as printers, other types of network elements such as relays, and Internet of Things objects. The various connections shown in FIG. 1 may be direct or indirect, wired or wireless communications, or a combination of wired and wireless connections. Computers 110 and databases 120 may be physical elements or logical elements, or a mix of physical and logical elements. Computers 110 and databases 120 may be virtual machines. Computer 110 and databases 120 may be local, remote or cloud-based elements, or a mix of local, remote and cloud-based elements. Computers 110 may be client workstation computers, or server computers including inter alia file transfer protocol (FTP) servers, email servers, structured query language (SQL) servers, secure shell (SSH) servers and other application servers, or a mix of client and server computers. An information technology (IT) department manages and controls network 100 in order to serve the enterprise requirements and meet the enterprise needs.

Access to computers 110 and servers 120 in network 100 may optionally be governed by an access governor 150, such as a directory service, that authorizes users to access computers 110 and databases 120 based on "credentials". Access governor 150 may be a name directory, such as ACTIVE DIRECTORY® developed by Microsoft Corporation of Redmond, Wash., for WINDOWS® environments. Background information about ACTIVE DIRECTORY® is available at Wikipedia. Other access governors for WINDOWS and non-WINDOWS environments, include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. Access governor 150 may be one or more authorization servers, such as a database server or an application server.

In lieu of access governor 150, the endpoints and/or servers of network 100 determine their local access rights.

Credentials for accessing computers 110 and databases 120 include inter alia server account credentials such as <address> <username> <password> for an FTP server, an SQL server, or an SSH server. Credentials for accessing computers 110 and databases 120 also include user login credentials <username> <password>, or <username> <ticket>, where "ticket" is an authentication ticket, such as a ticket for the Kerberos authentication protocol or NTLM hash used by Microsoft Corp.; or login credentials via certificates or via another implementation used today or in the future. Background information about the Kerberos protocol and the LM hash is available at Wikipedia.

Access governor 150 may maintain a directory of computers 110, databases 120 and their users. Access governor 150 authorizes users and computers, assigns and enforces security policies, and installs and updates software. When a user logs into a computer 110, access governor 150 checks the submitted password, and determines if the user is an administrator (admin), a normal user (user) or other user type.

Computers 110 may run a local or remote security service, which is an operating system process that verifies users logging in to computers and other single sign-on systems and other credential storage systems.

Network 100 may include a security information and event management (SIEM) server 160, which provides real-time analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a demilitarized zone (DMZ), which is a gateway between enterprise network 100 and external internet 10. Firewall 180 controls incoming and outgoing traffic for network 100. Background information about firewalls and DMZ is available at Wikipedia.

One of the most prominent threats that an enterprise faces is a targeted attack; i.e., an individual or group of individuals that attacks the enterprise for a specific purpose, such as leaking data, modifying data and systems, and sabotaging data and systems. Targeted attacks are carried out in multiple stages, typically including inter alia reconnaissance, penetration, lateral movement and payload.

The reconnaissance stage involves collecting information that assists an attacker to infiltrate the enterprise network. There are diverse types of information that are of interest to attacker, and there are diverse resources that an attacker uses for collecting information. One of the primary resources used by an attacker to infiltrate an enterprise network is "open source intelligence" (OSINT), which is information that is available on the network from publicly available sources, such as social media sites TWITTER®, FACEBOOK®, YOUTUBE®, and others. An attacker leverages OSINT to infiltrate a victim's network.

The lateral movement stage involves orientation, movement and propagation, and includes establishing a foothold within the enterprise and expanding that foothold to additional systems within the enterprise.

In order to carry out the lateral movement stage, an attacker, whether a human being who is operating tools within the enterprise network, or a tool with "learning" capabilities, learns information about the environment it is operating in, such as network topology and enterprise structure, implemented security solutions, and then operates in accordance with that data. One method to defend against such attacks, termed "honeypots", is to plant and monitor deceptive information/decoys/bait, with the objective of the attacker learning of their existence and then consuming those bait resources, which are monitored, and to notify an administrator of the malicious activity. Background information about honeypots is available at Wikipedia.

There are several problems with conventional deception-based security solutions. Conventional Internet-facing honeypots are deceptive emulated systems that have public-facing interfaces with the objective of detected targeted attacks. A main disadvantage of such systems is that the Internet is automatically being scanned, all the time. Many tools like scrapers, vulnerability scanners and others identify new assets in the Internet and map them. This affects Internet honeypots as it creates too many false positive alerts, and the enterprise cannot differentiate between a real attack and an automatic scan.

Conventional deception technology are systems that plant deceptive information in enterprise resources, which points to trap servers, in order to detect an attacked who is moving laterally within the enterprise. A main disadvantage of such systems is that it is focused on tracking internal lateral movement within the enterprise network, which does not address detecting an attacker who uses OSINT resources to infiltrate the network, nor an attacker with high deception awareness.

SUMMARY

The present invention automatically generates deceptive information and plants it in digital OSINT resources, which in turn enables fast and easy detection of advanced attackers.

Advanced attackers generally try to penetrate a network based on OSINT information. Advanced attackers are hesitant to use enumeration tools once they have breached a resource in the enterprise network. Instead of using enumeration, they use pre-collected data which they found in OSINT resources in a reconnaissance stage. The present invention addresses such attacker behavior by adding deceptive information to resources that attackers use for gathering information about the enterprise, including inter alia paste sites, public code repositories and search engines.

There is thus provided in accordance with an embodiment of the present invention a system to detect attackers who attempt to breach an enterprise network and attackers who have already breached the enterprise network, including an open source intelligence (OSINT) discoverer scanning the Internet to discover data related to an enterprise that is available online, an OSINT replacer generating deceptive files by replacing placeholders within template files with deceptive information, based on the data discovered by the OSINT discoverer, an OSINT distributor planting the deceptive files generated by the OSINT replacer within designated OSINT resources, and a deception management server that alerts an administrator in response to an attacker attempting to make a connection within the network using information in a deceptive file planted by the OSINT distributor.

There is additionally provided in accordance with an embodiment of the present invention a method for detecting attackers who attempt to breach an enterprise network and attackers who have already breached the enterprise network, including scanning the Internet for data of an enterprise that is available online, generating files and text by replacing placeholders within template files with deceptive information based on the results of said scanning, planting the files and text generated by the generating within OSINT resources, and alerting an administrator in response to an attacker attempting to make a connection within the enterprise network using information in a deceptive file planted by planting.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

| Table of elements in the FIGS. | |
|---|---|
| Element | Description |
| 10 | Internet |
| 100 | enterprise network |
| 110 | network computers |
| 120 | network databases |
| 130 | network switches and routers |
| 140 | mobile devices |
| 150 | access governor (optional) |
| 160 | STEM server |
| 170 | DNS server |
| 180 | firewall |
| 200 | enterprise network with OSINT deceptions and trap server |
| 210 | deception management server |
| 211 | management console |
| 212 | forensic application |
| 220 | OSINT deceptions console |
| 221 | OSINT discoverer |
| 222 | templates editor |
| 223 | OSINT replacer |
| 224 | OSINT distributor |
| 225 | OSINT console |
| 226 | OSINT dictionary |
| 240 | trap servers |
| 242 | forensic alert module |
| 300 | template page |
| 310 | file type user interface |
| 320 | template user interface |
| 330 | information format user interface |
| 340 | distribution target user interface |

| Table of elements in the FIGS. | |
|---|---|
| Element | Description |
| 350 | input field |
| 360 | create button |
| 400 | distribution page |
| 410 | distribution file user interface |
| 420 | input field |
| 430 | browse button |
| 440 | distribution site user interface |
| 450 | input field |
| 460 | user credentials |
| 470 | input field |
| 480 | distribute button |

Elements numbered in the 1000's are operations of flow charts.

DETAILED DESCRIPTION

Open source intelligence (OSINT) is used by an attacker to find information about his target; and is used by a defender for risk management, to understand what OSINT information exists about its enterprise. OSINT resources include inter alia social media sites TWITTER® (a registered trademark of Twitter, Inc. of San Francisco, Calif.), FACEBOOK® (a registered trademark of Facebook, Inc. of Menlo Park, Calif.) and YOUTUBE® (a registered trademark of Google LLC of Mountain View, Calif.), and Internet platform resources such as GITHUB® (a registered trademark of GitHub, Inc. of San Francisco, Calif.), WEPASTE™/PASTEBIN™, LINKEDIN® (a registered trademark of LinkedIn Corporation of Sunnyvale, Calif.) and MAILINATOR® (a registered trademark of Manybrain, Inc. of San Francisco, Calif.). Embodiments of the present invention plant deceptive information in OSINT resources.

Figure 2:
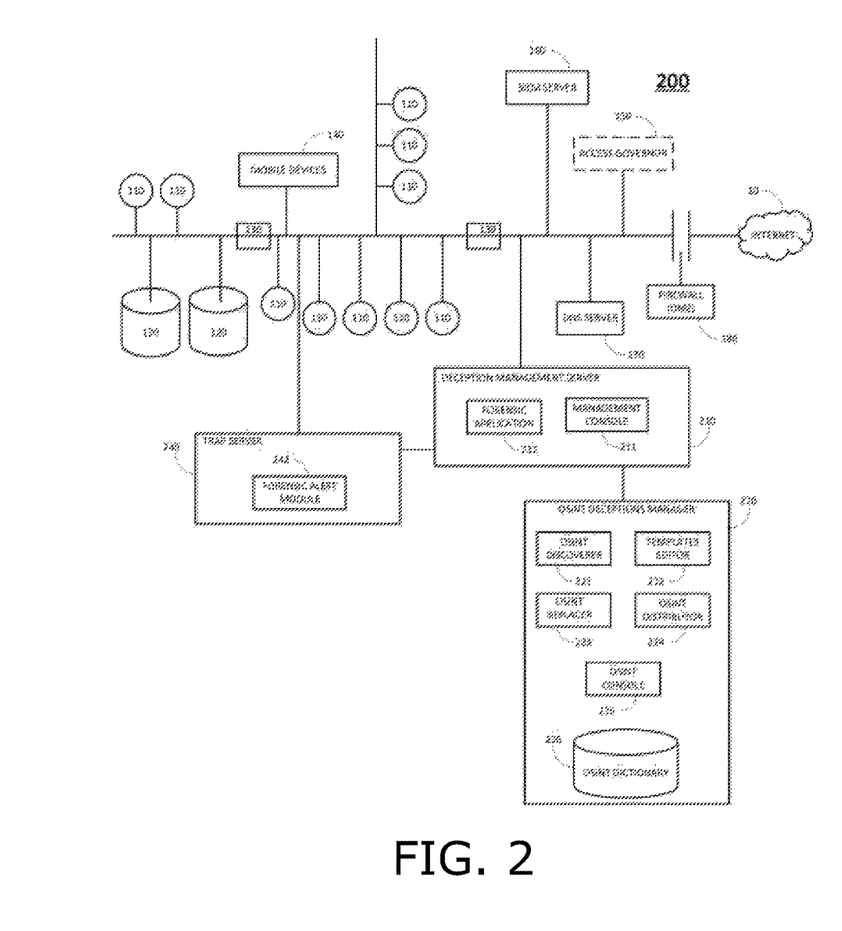
FIG. 2 is a simplified diagram of a system that uses open source intelligence (OSINT) deceptions to detect attackers who attempt to breach an enterprise network and attackers who have already breached the enterprise network, in accordance with an embodiment of the present invention.

Reference is made to FIG. 2, which is a simplified diagram of a system 200 that uses OSINT deceptions to detect attackers who attempt to breach an enterprise network and attackers who have already breached the enterprise network, in accordance with an embodiment of the present invention. In addition to the components of enterprise network 100 of FIG. 1, system 200 includes a deception management server 210, an OSINT deceptions manager 220, and a trap server 240.

Deception management server 210 is synchronized with access governor 150 and with SIEM server 160. Deception management server 210 collects attacker forensic data in two stages. During the first stage, as soon as attacker events are detected by access governor 150, a forensic application 212 is transmitted to the attacker's source computer. Forensic application 212 collects real-time forensics and delivers them to SIEM server 160. Additionally, if the attacker is lured to trap server 240, then a forensic alert module 242 alerts deception management server 210 and collects forensics for the attacker's actions on trap server 240. During the second stage, when incidents are completed, advanced information including inter alia file histories are compiled from compromised hosts and displayed in a management console 211.

OSINT deceptions manager 220 includes and manages several modules; namely, an OSINT discoverer 221, a templates editor 222, an OSINT replacer 223, an OSINT distributor 224, a console 225, and an OSINT dictionary 226. OSINT discoverer 221 scans public open source resources to find data relating to the enterprise. OSINT discoverer 221 returns a summary of data relating to the enterprise that was found online, including inter alia server names, IP addresses, e-mail addresses, and domain hostname information. In an embodiment of the present invention, OSINT discoverer 221 crawls and scrapes the OSINT resources, searching for relevant information by using regular expressions. OSINT discoverer 221 then analyzes the data, removes the irrelevant information, and presents on OSINT console 225 a summary of the information sorted by data type including inter alia IP address, e-mail address and hostname.

Templates editor 222 enables an administrator or such other user to manually create deceptive files, and/or to use existing templates of files and textual information to be planted in OSINT resources. Templates contain inter alia IP addresses and/or hostnames, paths, usernames and passwords.

Figure 3:
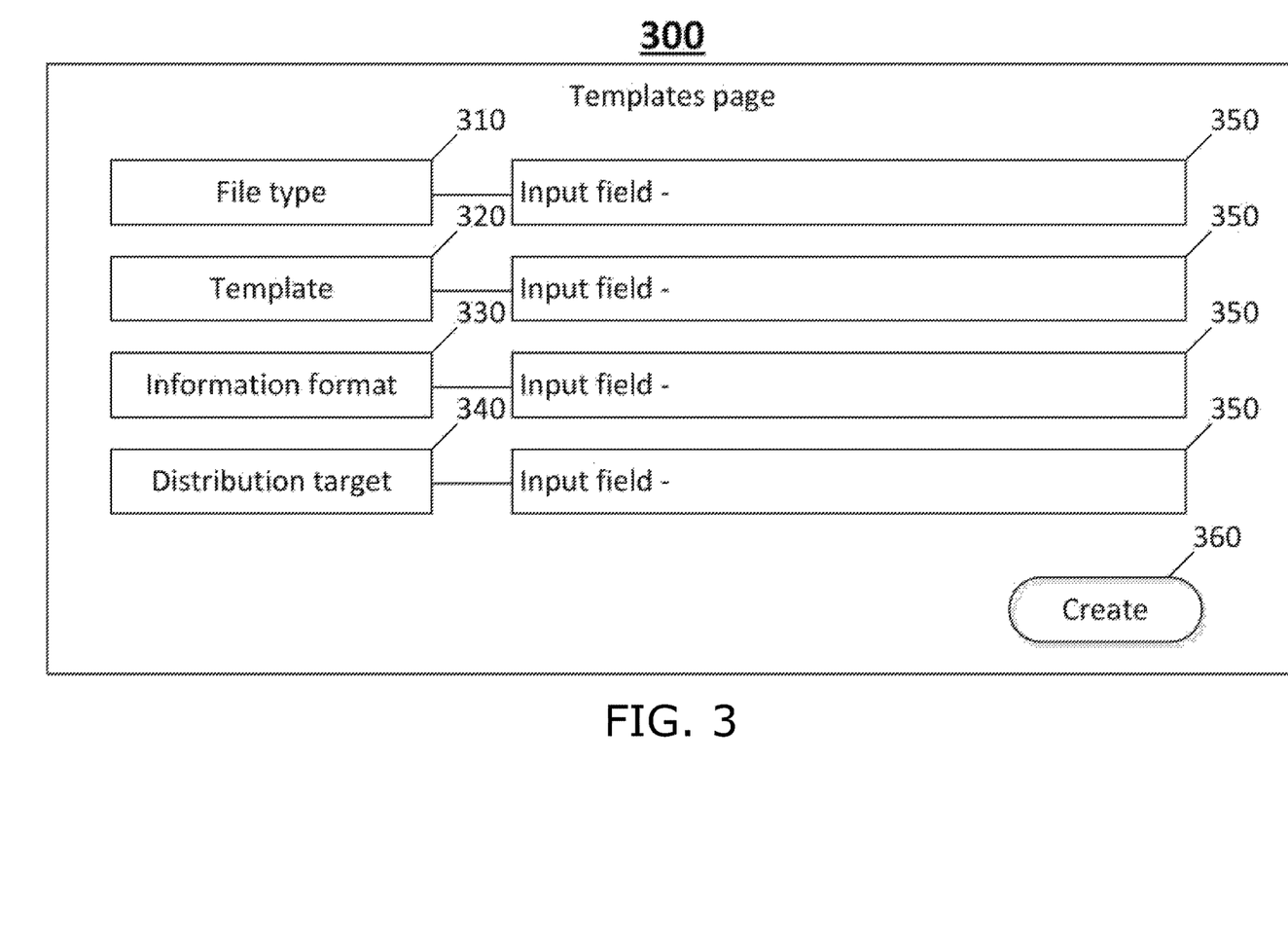
FIG. 3 is a simplified diagram of a template page for use in deploying deceptions in OSINT, in accordance with an embodiment of the present invention.

Reference is made to FIG. 3, which is a simplified diagram of a template page 300 for use by templates editor 222 in deploying deceptions in OSINT, in accordance with an embodiment of the present invention. Template page 300 includes user interfaces for file type 310, template 320, information format 330, and distribution target 340. Each user interface includes an input field 350 for entering data. After the template is defined, a create button 360 enables creation of the template.

Templates editor 222 works with OSINT dictionary 226, which may automatically generate template data based on results obtained from OSINT discoverer 221. E.g., if the enterprise has an e-mail address real_name@example.com, then a deception generated may be fictitious_name@example.com. If the enterprise has an account with an Internet-based platform such as GITHUB®, deceptive data is uploaded using the enterprise account.

The inputs to OSINT replacer 223 are OSINT dictionary 226, the template files, and the output of OSINT discoverer 221. OSINT replacer 223 iterates over selected template files, and replaces placeholders with deceptive information from OSINT dictionary 226. E.g., OSINT replacer 223 may replace <user_name> with a fictitious name, and <password> with a fictitious password. The outputs of OSINT replacer 223 are the filled-in template files.

Figure 4:
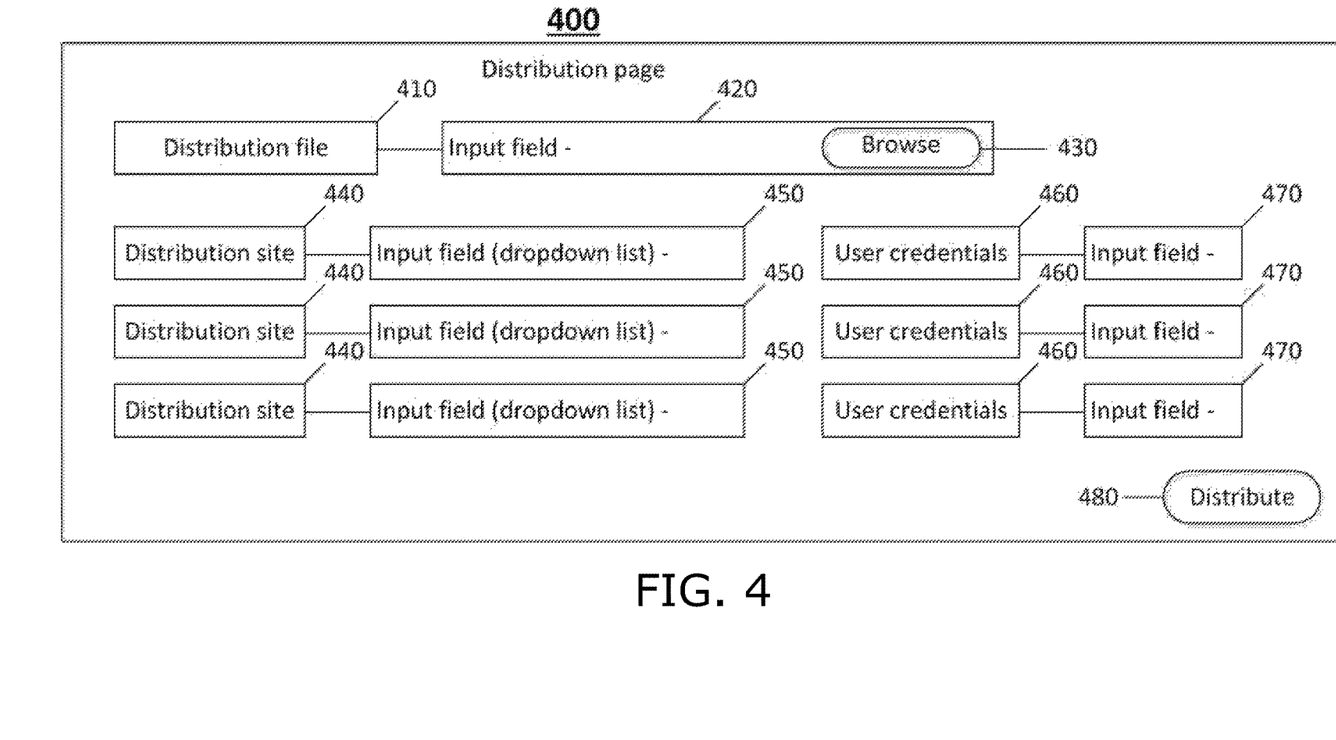
FIG. 4 is a simplified diagram of a distribution page for use in deploying deceptions in OSINT, in accordance with an embodiment of the present invention.

Reference is made to FIG. 4, which is a simplified diagram of a distribution page 400 for use by OSINT replacer 223 in deploying deceptions in OSINT, in accordance with an embodiment of the present invention. Distribution page 400 includes a user interface for distribution file 410, and input field 420 for entering a file, and a browse button for browsing enterprise network 200 to locate the file to be entered. Distribution page 400 further includes user interfaces for distribution sites 440, input fields 450 with dropdown lists for selecting desired distribution sites to plant the distribution file, user interfaces for user credentials 460 for each distribution site, and input fields 470 for entering appropriate credentials. After distribution page 400 is completed, a distribute button 480 causes distribution file 410 to be planted in selected distribution sites 440.

OSINT distributor 224 takes data generated from OSINT dictionary 226, and plants the data in many OSINT resources, including inter alia GITHUB, WEPASTE/PASTEBIN, LINKEDIN and MAILINATOR. Thus deceptive scripts for file backups may be planted in GITHUB; paste of dumped deceptive user credentials may be planted in WEPASTE/PASTEBIN; links to sites with deceptive data may be planted in LINKEDIN; and mail with deceptive credentials may be planted in MAILINATOR. Deceptive data may be uploaded to these resources automatically from OSINT deception manager 220, if credentials are available, or manually by visiting the relevant websites.

Console 225 enables the administrator or such other user to view and approve the created deceptions.

When an attacker attempts a connection using a deception planted in OSINT, management server 210 is alerted. The connection may lead to trap server 240, in which case trap server 240 activates a forensic alert module 242. Trap server 240 keeps the connection open while deception management server 210 collects forensics from trap server 240. When forensics have been gathered, the attacker's access attempt ends unsuccessfully. Real-time forensics are critical for identifying the scope of an attack, the attacker's tools and methods, and the context of the attack. Real-time forensics, using direct communication, avoids risking latency and failures of third-party communication tools. With direct communication, forensics are delivered immediately upon attack detection.

In addition to obtaining forensics from trap server 240, deception management server 210 may send its forensic application 212 to the attacker's source computer. Forensic application 212 is an executable that runs on the attacker's source computer to collect forensics therefrom. As such, forensics are not only collected from trap server 240.

Alternatively, when the attacker attempts a connection using a deception planted in OSINT, the connection need not lead to trap server 240. Instead, the attempted connection causes a failed logon attempt to be logged in access governor 150; e.g., from Active Directory events. Deception management server 210 monitors access governor 150 for such failed logon attempts, thus identifying an attacker's attempt to use deceptive OSINT credentials by reading failed logon events from access governor 150. As such, it will be appreciated that use of trap server 240 is not essential to the present invention. For example, if a deception includes a user that exists on Active Directory, it suffices to detect a failed logon attempt from this user to trigger an alert, because no one should be using this user unless he found it in OSINT.

Thus for an attacker who has already compromised an endpoint/server in network 200, he may try to move laterally with network 200 using credentials he found online, and then upon failed logon event on the Active Directory an alert is triggered. Specifically, when an attacker attempts a connection using a deception planted in OSINT, a failed logon attempt may be logged by access governor 150, and deception management server 210 monitors access governor 150 and triggers alerts based on such failed events.

Figure 5:
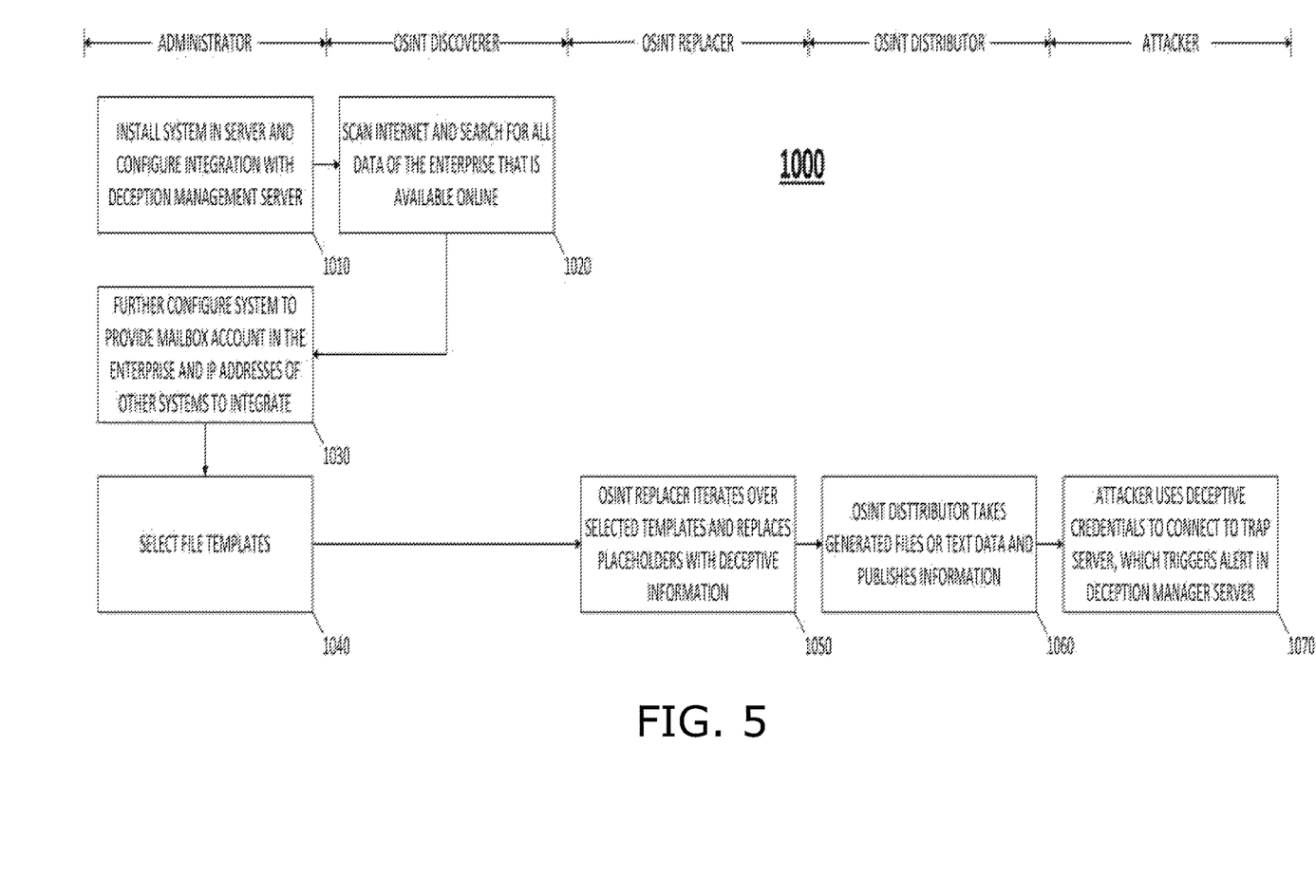
FIG. 5 is a simplified flowchart of a method that uses OSINT deceptions to detect attackers who attempt to breach an enterprise network and attackers who have already breached the enterprise network, in accordance with an embodiment of the present invention.

Reference is made to FIG. 5, which is a simplified flowchart of a method that uses OSINT deceptions to detect attackers who attempt to breach an enterprise network and attackers who have already breached the enterprise network, in accordance with an embodiment of the present invention. FIG. 5 is divided into five columns corresponding to operations performed respectively by an administrator or such other user, by OSINT discoverer 221, by OSINT replacer 223, by OSINT distributor 224, and by an attacker.

At operation 1010, the administrator or such other user installs the OSINT system of the present invention on OSINT deceptions manager 220, and configures integration with deception management server 210. By integrating OSINT deceptions manager 220 with deception management server 210, detection of attempts to use a deceptive entity in network 200 is facilitated. Installation of OSINT deception manager 220 is a quick installation that sets up a web interface and backend components. The installation is simple and requires nothing special.

At operation 1020 OSINT discoverer 221 scans the Internet to find enterprise data, including inter alia e-mail addresses, IP addresses, hostnames, employees and usernames, that is available online. OSINT discoverer 221 presents a summary of information that was found online.

In an embodiment of the present invention, OSINT discoverer 221 crawls and scrapes the OSINT resources, searching for relevant information by using regular expressions. OSINT discoverer 221 then analyzes the data, removes the irrelevant information, and presents in OSINT console 225 a summary of the information sorted by data type including inter alia IP address, e-mail address and hostname.

At operation 1030 the administrator or such other user further configures OSINT deceptions manager 220 by supplying information including inter alia a mailbox account in the enterprise, and IP addresses of systems that OSINT deceptions manager 220 integrates with, including inter alia a mail server and deception management server 210.

At operation 1040 the administrator or such other user provides file templates to templates editor 222, or selects file templates from templates editor 222; e.g., PowerShell code for file backups, and text of "paste sites" with credentials in the text.

At operation 1050 OSINT replacer 223 iterates over the selected template files and replaces placeholders with corresponding deceptive information. E.g., a placeholder <username> is replaced with a deceptive username, and a placeholder <password> is replaced with a deceptive password.

At operation 1060 OSINT distributor 224 automatically plants the generated files or text data, using the supplied credentials, in various OSINT resources, such as paste sites like PasteBin.com, public code repositories like GitHub.com, and malware samples sharing platforms like virustotal.com. OSINT distributor 224 also enables manual distribution, whereby the administrator or such other user retrieves files or text and manually uploads the contents.

In an embodiment of the present invention, OSINT distributor 224 plants the files or text data by using each website's application programming interface.

At operation 1070 the attacker uses deceptive credentials to connect to trap server 240, which triggers a forensic alert in deception management server 210.

It will be appreciated by those skilled in the art that administration of OSINT deceptions manager 220 is simple. The administrator or such other user conducts an OSINT scan using OSINT discoverer 221. In some embodiments of the present invention the administrator or such other user provides OSINT discoverer 221 with a domain name. When discovery is finished, the administrator or such other user uses templates editor 222 to select which template files are to be used, and generates manual template files as appropriate. After the template files are selected and generated, the administrator or such other user provides deceptive entity information, including inter alia usernames, passwords, hostnames and IP addresses, to OSINT replacer 223, which places the deceptive entity information in the template files. Finally, USINT distributor 224 plants the deceptive files in selected OSINT resources. Thereafter, any attempt by an attacker to use the deceptive information triggers an alert in deception management server 210.

Figure 6:
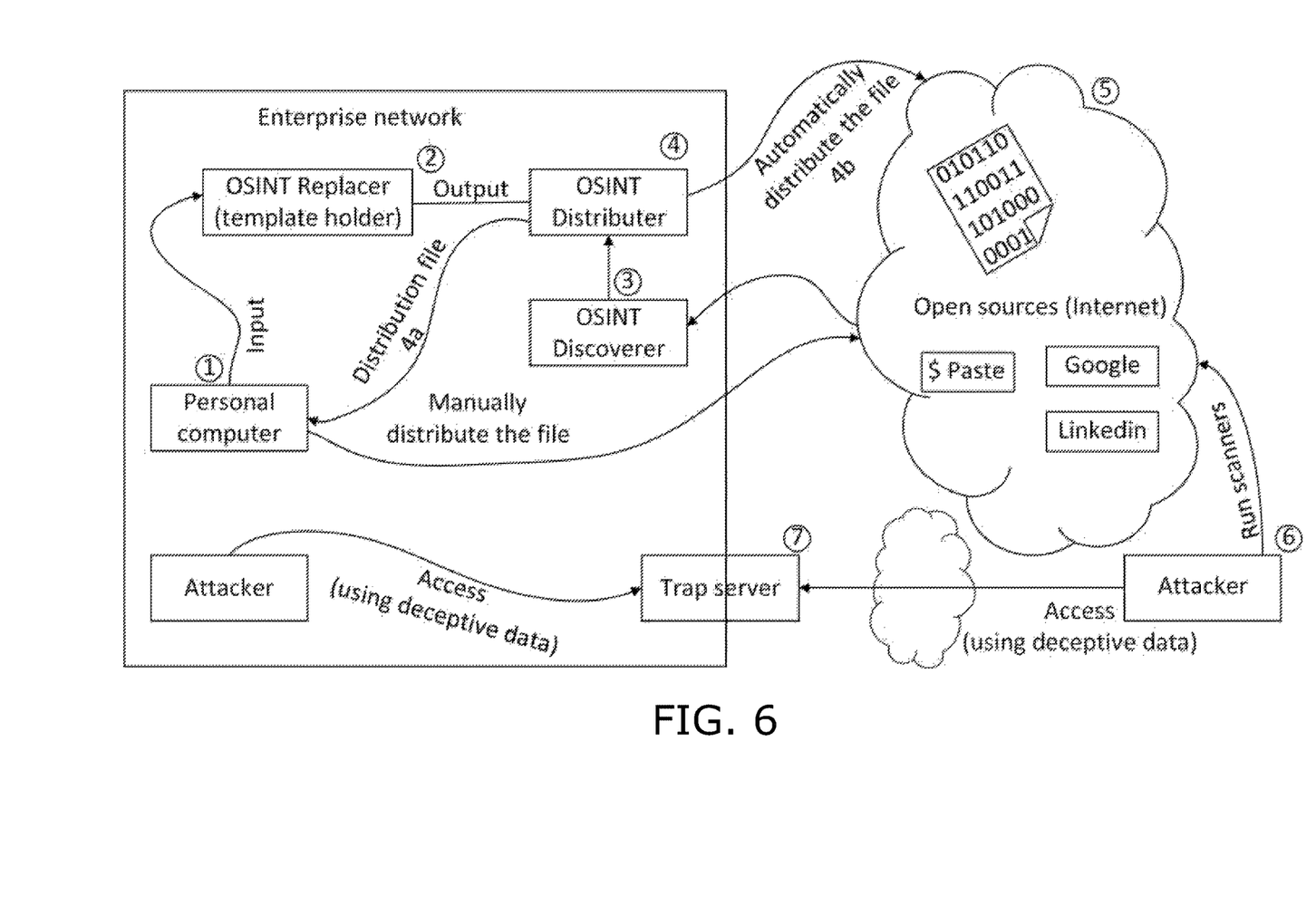
FIG. 6 is a simplified diagram illustrating an overview of the method of FIG. 3, in accordance with an embodiment of the present invention.

Reference is made to FIG. 6, which is a simplified diagram illustrating an overview of the method 1000, in accordance with an embodiment of the present invention. FIG. 6 illustrates seven stages, as follows.

1. Input: resource creation and data collection from the enterprise
2. OSINT replacer 223: replace collected data with deceptive information from dictionary
3. OSINT discoverer 221: crawls selected websites and searches for the enterprise's presence on each site
4. OSINT distributor 224:
   a. Send information to internal host, to upload data from computer;
   b. Distribute information manually on web resources, based on information collected from OSINT discoverer 221
5. Data upload: Deceptive data is uploaded to open sources, and ready to be used by attackers
6. Detective data used: Attacker scans open sources and uses deceptive data
7. Incident triggering: What deceptive data is used, it triggers an incident, and forensic data on the attack is collected.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system to detect attackers who attempt to breach an enterprise network and attackers who have already breached the enterprise network, comprising:
   an open source intelligence (OSINT) discoverer within an enterprise network scanning public open source Internet resources outside of the enterprise network to discover open source Internet resources that contain data related to the enterprise that is publicly available online, wherein the enterprise network comprises switches and routers, and a firewall located within a gateway between the enterprise network and the Internet;
   an OSINT replacer generating deceptive files by replacing placeholders within template files with deceptive information, based on the data discovered by said OSINT discoverer;
   an OSINT distributor planting the deceptive files generated by said OSINT replacer within public open source Internet resources outside of the enterprise network, that were discovered by said OSINT discoverer; and
   a deception management server that alerts an administrator in response to an attacker attempting to make a connection within the enterprise network using information in a deceptive file planted by said OSINT distributor.

2. The system of claim 1, further comprising a trap server that keeps a connection open when an attacker attempts to connect thereto using information in a deceptive file planted by said OSINT distributor, wherein the deceptive files lead an attacker to said trap server, and wherein said deception management server collects forensic data from said trap server and delivers the forensic data to the administrator.

3. The system of claim 1, wherein said access governor logs a failed logon attempt when the attacker attempts to connect to a resource in the enterprise network using information in a deceptive file planted by said OSINT distributor.

4. The system of claim 1 wherein said deception management server transmits a forensic application that runs on the attacker's source computer to collect forensic data related to the attacker's actions, in response to the attacker attempting to make a connection within the network using information in a deceptive file planted by said OSINT distributor.

5. The system of claim 1 further comprising a templates editor for creating template files with placeholders, for use by said OSINT replacer.

6. The system of claim 1 wherein the enterprise has account credentials with an Internet-based platform, and wherein said OSINT distributor uses the enterprise account credentials to plant the deceptive files in the Internet-based platform.

7. The system of claim 6 wherein the Internet-based platform is a social media platform, a development platform, a file sharing platform, or a file backup platform.

8. The system of claim 1 wherein said OSINT distributor plants deceptive text in paste sites.

9. The system of claim 1 further comprising a dictionary of OSINT deceptive data based on the data discovered by said OSINT discoverer, and wherein said OSINT replacer replaces placeholders in template files with data in the dictionary.

10. A method for detecting attackers who attempt to breach an enterprise network and attackers who have already breached the enterprise network, comprising:
scanning, from within the enterprise network, public open source Internet resources outside of the enterprise network to discover open source Internet resources that contain data related to the enterprise that is publicly available online, wherein the enterprise network comprises switches and routers, and a firewall located within a gateway between the enterprise network and the Internet;
generating files and text by replacing placeholders within template files with deceptive information based on the results of said scanning;
planting the files and text generated by said generating within public open source Internet resources outside of the enterprise network, that were discovered by said scanning; and
alerting an administrator in response to an attacker attempting to make a connection within the enterprise network using information in a deceptive file planted by planting.

11. The method of claim 10 wherein the generated files and text lead an attacker to a trap server, the method further comprising:
keeping a connection to the trap server open, when the attacker attempts to connect to the trap server using deceptive information planted by said planting;
collecting forensic data from the trap server while the connection to the trap server is open; and
transmitting the forensic data to an administrator.

12. The method of claim 10 further comprising logging a failed logon attempt when the attacker attempts to connect to a resource in the enterprise network using information in a deceptive file planted by said OSINT distributor.

13. The method of claim 10 further comprising transmitting a forensic application that runs on the attacker's source computer to collect forensic data related to the attacker's actions, in response to the attacker attempting to make a connection within the network using information in a deceptive file planted by said OSINT distributor.

14. The method of claim 10 further comprising creating template files with placeholders, for use by said generating.

15. The method of claim 10 wherein the enterprise has account credentials with an Internet-based platform, and wherein said planting uses the enterprise account credentials to plant the deceptive files in the Internet-based platform.

16. The method of claim 15 wherein the Internet-based platform is a social media platform, a development platform, a file sharing platform, or a file backup platform.

17. The method of claim 10 wherein said planting plants deceptive text in paste sites.

18. The method of claim 10 further comprising compiling a dictionary of OSINT deceptive data based on the results of said scanning, and wherein said generating replaces placeholders in template files with data in the dictionary.

* * * * *